United States Patent [19]

Soward et al.

[11] Patent Number: 4,888,975

[45] Date of Patent: Dec. 26, 1989

[54] RESILIENT WEDGE FOR CORE EXPANDER TOOL

[76] Inventors: Milton W. Soward; F. Pat Bailey, both of P.O. Box 609, Hawkins, Tex. 75765

[21] Appl. No.: 182,935

[22] Filed: Apr. 18, 1988

[51] Int. Cl.[4] ........................ B21D 3/14; B21D 41/02; F16C 29/02; F16C 33/20

[52] U.S. Cl. ........................ 72/392; 384/909

[58] Field of Search .................. 72/392, 393; 384/297, 384/909

[56] References Cited

U.S. PATENT DOCUMENTS

| | | | |
|---|---|---|---|
| 1,932,584 | 1/1933 | Hansen | 72/392 |
| 1,959,369 | 5/1934 | Kronquest et al. | 72/392 |
| 2,246,086 | 6/1941 | Austin | 384/909 |
| 2,432,458 | 7/1947 | Martin | 72/393 |
| 2,497,836 | 2/1950 | Miller | 72/392 |
| 2,643,562 | 6/1953 | Geddes | 72/392 |
| 3,292,903 | 12/1966 | Meyer | 72/392 |
| 3,618,895 | 11/1971 | Van Gompel | 254/93 R |
| 3,625,046 | 12/1971 | Van Gompel | 72/392 |
| 3,635,440 | 1/1972 | Van Gompel | 254/93 H |
| 3,677,058 | 7/1972 | Van Gompel | 72/393 |
| 3,749,365 | 7/1973 | Van Gompel | 72/393 |
| 3,817,079 | 6/1974 | Priester | 72/392 |
| 4,155,242 | 5/1979 | Peterson | 72/392 |
| 4,319,790 | 3/1982 | Thomson | 384/909 |

FOREIGN PATENT DOCUMENTS

| | | | |
|---|---|---|---|
| 20331 | 2/1983 | Japan | 72/393 |

OTHER PUBLICATIONS

B-13,442, Single Page Sheet Illustrating "FIGS. 1 through FIGS. 4", Showing Rollers (24).

A 4 page pamphlet "Poly—Hi Engineers Guide for Tivar-100", Menasha Corp. 2710 American Way, Fort Wayne, Ind.

*Primary Examiner*—Robert L. Spruill

*Attorney, Agent, or Firm*—Gunn, Lee & Miller

[57] ABSTRACT

An expansion tool having a resilient wedge held in the inner face of an expandable jaw for engaging a ram tongue to expand the jaw. Each resilient wedge has a surface which has a low coefficient of friction, is self-lubricating and which does not bind with the surface of the tongue at high pressure, is angled to repeatedly engage the tongue and communicate great pressure to the jaws without the use of breakable or moving parts in the jaws, is comprised of a material resilient enough and is properly angled to cause the tongue to disengage when the pressure is released, and is hard, dense, and resilient enough to repeatedly withstand great pressure without breaking.

14 Claims, 2 Drawing Sheets

RESILIENT WEDGE FOR CORE EXPANDER TOOL

FIELD OF THE INVENTION

The present invention relates generally to an improved expansion tool, and more particularly to a tool for reforming deformed cores of coiled sheet material and other difficult to expand items.

BACKGROUND OF THE INVENTION

Sheet materials such as paper, metal foil, and the like are often rolled in coils on hollow cores for storage and handling. In the can industry, for example, aluminum sheet material is manufactured and rolled in coils on metal cores at one site and then shipped to another site for uncoiling in the manufacture of cans. Rolls of paper of the type suitable for use as newsprint are manufactured and shipped in the same manner.

Such rolls can be quite heavy and difficult to handle: and this handling can partially collapse or deform the cores. Before the rolls can be handled further or mounted on a support arbor, the cores must be reopened and substantially restored to their original shape. This is typically done by inserting an expandable tool into the core.

Several such expansion tools have been developed for this purpose. Tools representative of the prior art are shown in U.S. Pat. Nos. 3,749,365; 3,677,058; 3,635,440; 3,625,046; and 3,618,895 to Van Gompel as well as U.S. Pat. No. 3,292,903 to Meyer and U.S. Pat. No. 4,155,242 to Peterson. However, these devices are not capable of withstanding the tremendous pressures, sometimes upwards of twenty-five tons, that are brought to bear upon the jaws and tongue of the expansion device.

U.S. Pat. No. 2,643,562 (Geddes, 1953) discloses a spreading tool designed primarily for reshaping deformed automobile bodies. This reference discloses a linkage means to expand the jaws of the tool.

U.S. Pat. No. 1,932,584 (Hanson, 1933) suggests the use of a wedge-shaped slide to actuate the jaws outward, though the apparatus in Hanson is designed for exerting only minimal outward force which is necessary for reshaping a can.

Rollers have also been developed for transferring the expansion force of the tongue or spreading fork to the deformed roll. However, at high pressures the rollers are subject to frequent breakage. Metal bearing surfaces have also not worked well at high pressures as the tongue adheres to the metal jaws at the high pressures developed at the wedge/tongue interface as are necessary for the tasks for which the tool is designed. Metallic wedges used to date have suffered the same problem. Further, metal rollers, bearings and wedges require complicated means of attachment to the jaws which themselves break and/or require time and skill in replacing when any element of the pressure transference system needs to be accessed or removed.

A long-felt commercial need thus exists for an improved core expander tool with a durable, replaceable, maintenancefree wedge having a bearing surface capable of transferring expansion forces of over 3,000 pounds or more from the tongue through the jaws to the core and of releasing and forcing back the tongue after each use during multiple core reforming operations, all without breakage or binding.

SUMMARY OF THE INVENTION

The present invention comprises an improved core expander tool for straightening rolls of sheet material and other difficult to expand items which overcomes the foregoing difficulties associated with the prior art.

Structurally the invention comprises an improved expansion tool having a resilient wedge held in the inner face of an expandable jaw for engaging a ram tongue to expand the jaw. Each resilient wedge has a surface which has a low coefficient of friction, is self-lubricating and which does not bind with the surface of the tongue at high pressure, is angled to repeatedly engage the tongue and communicate great pressure to the jaws without the use of breakable or moving parts in the jaws, is comprised of a material resilient enough and is properly angled to cause the tongue to disengage when the pressure is released, and is hard, dense, and resilient enough to repeatedly withstand great pressure without breaking.

In accordance with the invention, there is provided an improved tool, including a pair of jaws pivoted to one end of a hollow collar. A central tongue, selectively driven by a cylinder coupled to the other end of the collar, is mounted for axial movement across a wedge-shaped, ultra high molecular weight polymer bearing surface, to actuate the jaws outwardly and thereby reform the core. The bearing surface is made from a material that is resilient, will not abrade easily, is self-lubricating and will not bind with the tongue, even at high pressures. The bearing surfaces are mounted in angular relationship to the surface of the tongue or spreading fork and on the opposed internal surfaces of the paired jaws. The invention may also be beneficially used with other difficult to expand items such as a down hole placed casing, etc.

BRIEF DESCRIPTION OF PREFERRED EMBODIMENT

Figure 1:
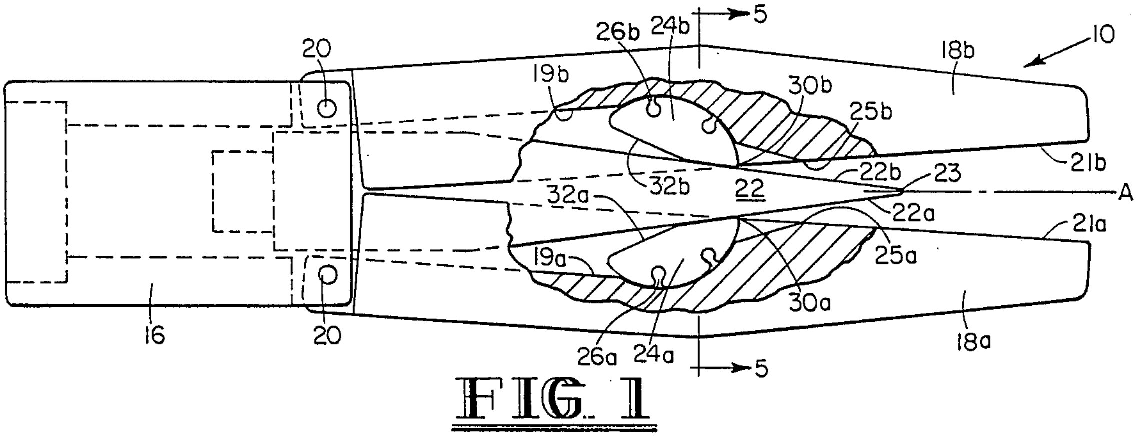
FIG. 1 is a side view of the tool with the jaws open.

FIG. 1 illustrates the side view of expander tool 10. Expander tool 10 has an axial configuration for insertion into the work piece and contains hollow, circular collar 16 onto which a pair of semi-cylindrical jaws 18*a* and 18*b* are attached, articulating at pins 20. Jaws 18*a* and 18*b* have external and internal surfaces, and their outside diameters are less than the cores they are designed to straighten.

Tongue 22 has a wedge shape that tapers to tongue point 23, is mounted for axial movement along longitudinal axis A and contains tongue faces 22*a* and 22*b* adapted to slidably engage wedges 24*a* and 24*b*. Jaws 18*a* and 18*b* have inside chambers 19*a* and 19*b* and inside faces 21*a* and 21*b*, respectively. Leading edges 25*a* and 25*b* of inside chambers 19*a* and 19*b*, respectively, mark the forward junction of inside chambers 19*a* and 19*b* and inside faces 21*a* and 21*b*. Leading edges 25*a* and 25*b* represent that portion of the interior surface of jaws 18*a* and 18*b* where the surface portion representing inside faces 21*a* and 21*b* break from their flush relationship when jaws 18*a* and 18*b* are shut (see FIG. 3) into interior surface portion of jaws 18*a* and 18*b* as represented by inside chambers 19*a* and 19*b*.

Wedges 24*a* and 24*b* lie against inside chambers 19*a* and 19*b*, respectively, generally conforming in shape thereto and detachably affixed at nipples 26*a* and 26*b*. Wedges 24*a* and 24*b* have leading edges 30*a* and 30*b*, respectively, on the forward portions thereof. of steel due to its durability and strength. Tongue 22 is preferably made of stainless steel due to its durability and strength and has highly polished, smooth tongue faces 22*a* and 22*b*.

As can be seen in FIG. 1, jaws 18*a* and 18*b* are expanded when tongue 22 is urged axially tip 23 first, therebetween. Moreover, FIG. 1 illustrates the manner in which wedges 24*a* and 24*b* act as bearing surfaces transferring the expansion force of tongue 22 to jaws 18*a* and 18*b* and ultimately to the work piece (not shown).

Figure 2:
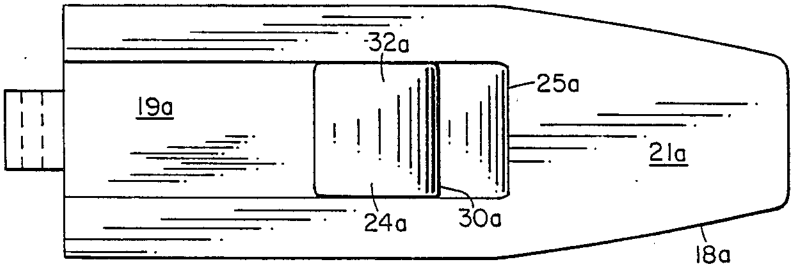
FIG. 2 is a top view of a single jaw illustrating the inside surface thereof.

FIG. 2 is a top view of inside chamber 19*a* of jaw 18*a*. FIG. 2 also illustrates how inside face 21*a* meets inside chamber 19*a* along leading edge 25*a*.

The generally rectangular shape of face 32*a* of wedge 24*a* may be seen in FIG. 2. Moreover, it is clear from this figure that wedge 24*a* is sized to fit within inside chamber 19*a*, and located rearward of leading edge 25. Such rearward location allows some deformation along leading edges 30*a* and 30*b* during engagement of tongue 22 with wedges 24*a* and 24*b*.

Figure 3:
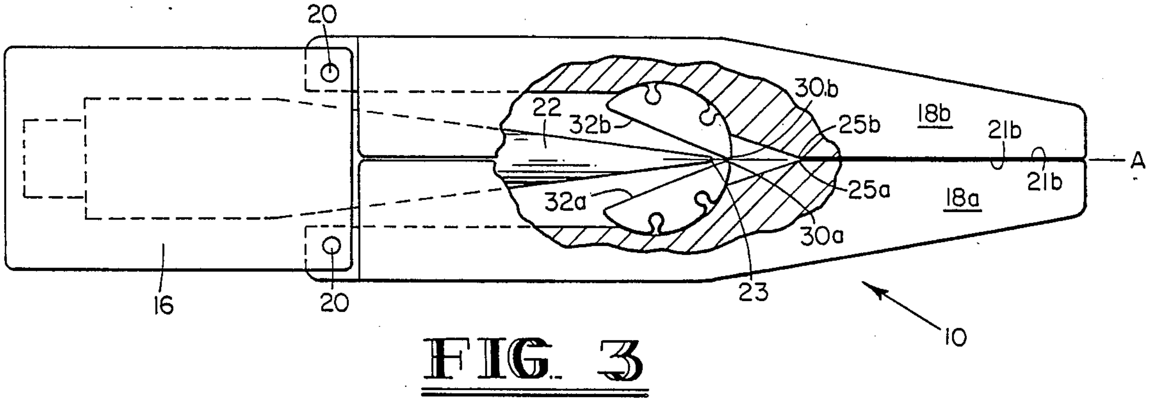
FIG. 3 is a side view of the tool with the jaws shut.

FIG. 3 illustrates expander tool 10 with jaws 18*a* and 18*b* in a shut or closed position. It also illustrates the tapered profile of the external surface of jaws 18*a* and 18*b* for ease of insertion into the work piece. Tongue 22 is illustrated in a retracted position with tip 23 behind wedges 24*a* and 24*b*.

FIG. 3 also illustrates the angular relationship between wedge faces 32*a* and 32*b* and tongue faces 22*a* and 22*b*. When jaws 18*a* and 18*b* are in the closed position, leading edges 30*a* and 30*b* are either very close or just touching (but not preventing jaws 18*a* and 18*b* from closing). In such a closed position, longitudinal axis A of expander tool 10 is coincident with the longitudinal axis of tongue 22. Tongue faces 22*a* and 22*b* are preferably 8 inches long, and tongue 22 preferably has about a 4 inch throw.

Figure 3A:
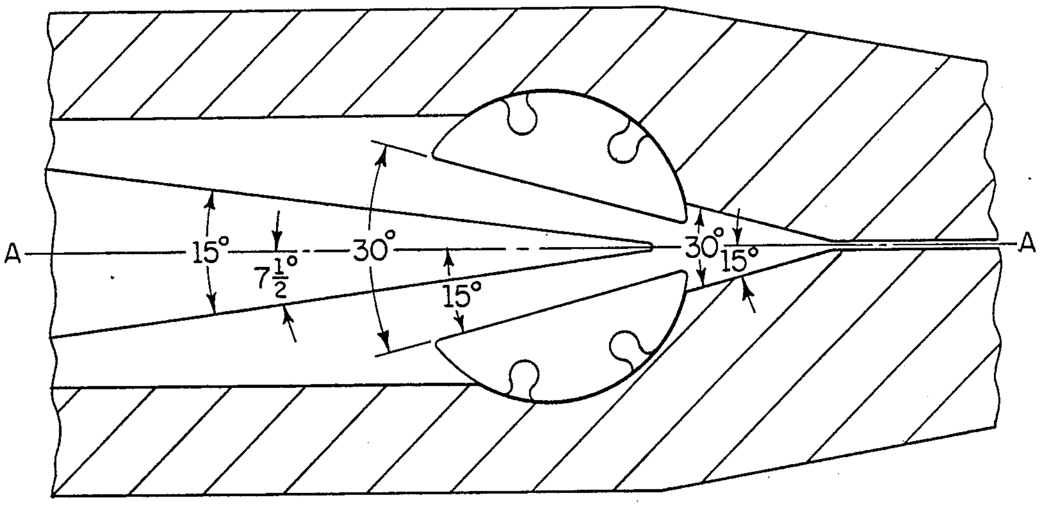
FIG. 3A is a view similar to FIG. 3 and depicting the angular relationships of the various surfaces of the tool.

FIG. 3*a* ore accurately depicts the angular relationship between and among inner faces 31*a* and 31*b* of jaws 18*a* and 18*b*, wedge faces 32*a* and 32*b* and tongue faces 22*a* and 22*b*. More specifically, the included angle between wedge faces 32*a* and 32*b* is preferably 30°. The range of the included angles between wedge faces 32*a* and 32*b* is also 20° to 40°. Preferred included angle between inner faces of jaws, 31*a* and 31*b* respectively, is also 30°. The range of included angles of the inner faces 31*a* and 31*b* of jaw 18*a* and 18*b* is 20° to 40°. The preferred included angle between tongue faces 22*a* and 22*b* is 15°. However, the range of this included angle can be between 10° and 20°.

Figure 4:
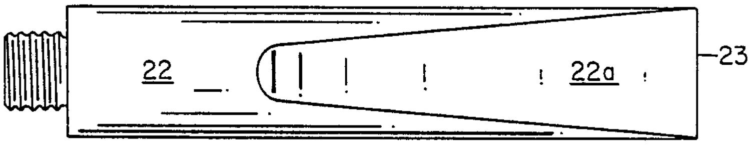
FIG. 4 is a top view of the tongue.

FIG. 4 illustrates tongue 22 removed from tool 10. Also seen is tongue face 22*a* and tip 23. To the rear of tongue face 22 the cross-sectional shape of tongue 22 is circular and dimensioned to fit within the cavity created by inside chamber 19*a* and 19*b* when jaws 18*a* and 18*b* are closed or shut. Tongue faces 22*a* and 22*b* are cut along a bias to the longitudinal axis of tongue 22 to meet at tip 23, much like the tip of a screw driver.

Figure 5:
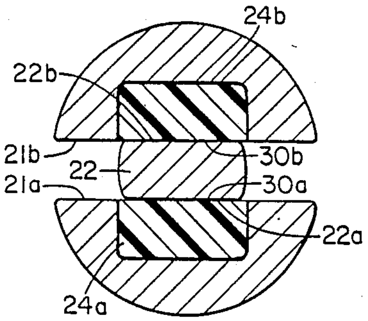
FIG. 5 is a sectional view of the tool.

FIG. 5 illustrates a transverse cross-sectional view of expander tool 10 with jaws 18*a* and 18*b* open. The manner in which forward motion of tongue 22 slides tongue faces 22*a* and 22*b* across wedges 24*a* and 24*b*, respectively, can be seen from this perspective. In addition, it can be seen that leading edges 30*a* and 30*b* are approximately flush with inside faces 21*a* and 21*b*. While there may be some sight deformation of wedges 24*a* and 24*b* during operation of expander tool 10, during which as much as 10 tons or more of pressure may be exerted on them, they will return to their general original configuration following the operations. Moreover, during the exertion of the force and straightening of the work piece, wedges 24*a* and 24*b* will not so deform that tongue 22 contacts jaws 18*a* and 18*b*.

The material selected for wedges 24*a* and 24*b* must be minimally capable of withstanding at least 100 operation cycles of expander tool 10 with a ram pressure of 3,000 pounds of pressure. Wedges 24*a* and 24*b* in practice have proven to withstand 1000 operation cycles at 6,000 pounds of ram pressure. Wedges 24*a* and 24*b* preferably are capable of withstanding 1,000 operation cycles at 10,000 pounds of pressure.

Wedges 24*a* and 24*b* are preferably made of a resilient material which is resistent to abrasion and impact, can absorb high energy, are self-lubricating, will not absorb water and have a very low coefficient of friction (preferably less than 0.23 dynamic coefficient of friction on polished steel). Wedges 24*a* and 24*b* must not bind with tongue 22 even at the high pressures generated and after repeated uses. Such characteristics are found in an ultrahigh molecular weight polymer such as TIVAR-100. Tivar-100 is the registered trademark for a specially formulated ultrahigh molecular weight polymer manufactured by Menasha Corporation of Fort Wayne, Ind.

In operation, expander tool 10 is inserted into a damaged roll of sheet stock. The insertion is done axially, the nose of jaws 18*a* and 18*b* being inserted first. When the damaged area is encountered tongue 22 is hydraulically actuated, moving forward approximately 4 inches with respect to the collar 16 and contacting leading edges 30*a* and 30*b* of wedges 24*a* and 24*b*. Continuing its forward motion, tongue 22 slides over the surface of wedges 24*a* and 24*b*. This expansive force forces jaws 18*a* and 18*b* open. This force is transferred to the damaged or collapsed portion of the work piece, restoring the same to its predeformed configuration.

Wedges 24*a* and 24*b* act as bearing surfaces which tongue faces 22*a* and 22*b* slidably engage. It is at the contact surfaces between tongue face 22*a* and wedge 24*a* and tongue face 22*b* and wedge 24*b* which the force exerted to expand the deformed core is concentrated. Wedges 24*a* and 24*b* preferably stand about one-eighth of an inch above inside faces 21*a* and 21*b* of jaws 18*a* and 18*b* at their bearing points.

The angle between tongue faces 22*a* and 22*b* and wedges 24*a* and 24*b* is important because it is the residual inward pressure of the expanded item upon the jaws and thereby wedges 24*a* and 24*b* upon tongue 22 which causes tongues 22 to retract from between wedges 24*a* and 24*b*. If tongue 22 fails to retract, expander tool 10 remains expanded, and thus locked within the expanded item. The disclosed wedge material's low coefficient of friction and self-lubricating abilities are useful in this regard. Other materials may be usefully used as wedges 24*a* and 24*b* if they can withstand the disclosed pressures without breaking, may be usefully formed and shaped and do not permit tongue 22 to adhere to or weld to them. Metal alloys and ceramic materials which have these properties may possibly be used in addition to the disclosed preferred wedge material.

Terms such as "left," "right," "up," "down," "bottom," "top," "front," "back," "in," "out," and the like are applicable to the embodiment shown and described in conjunction with the drawings. These terms are merely for the purposes of description and do not necessarily apply to the position or manner in which the invention may be constructed or used.

Although the invention has been described with reference to a specific embodiment, this description is not meant to be construed in a limiting sense. Various modifications of the disclosed embodiments will become apparent to those skilled in the art upon reference to the description of the invention. It is therefore contemplated that the appended claims will cover such modifications that fall within the true scope of the invention.

I claim:

1. A device for straightening a deformed core of a roll of sheet material, including:
   a hollow collar;
   at least a pair of jaws comprised of a first and a second jaw, the pair pivoted to the collar, the jaws having external and internal surfaces; the collar and the jaws being sized for receipt by the core;
   a tongue with at least two faces tapered to an edge and mounted for longitudinal movement within the jaws and the collar;
   means secured to the collar for selectively driving the tongue between the jaws to actuate the jaws outward;
   a pair of wedges, said pair comprising a first wedge with a first face thereon and a second wedge with a second face thereon, the first wedge being mounted to the internal surface of the first jaw and the second wedge being mounted to the internal surface of the second jaw, said pair of wedges thereby being in an opposing relationship on the internal surfaces of the jaws for engaging at an acute angle the faces of the tongue during the driving of the tongue between the jaws, wherein such engaging prevents contact between the jaws and the tongue, said pair of wedges having a surface with a low coefficient of friction which does not bind to the surface of the tongue at pressures of 10 tons or more and is angled to engage the tongue and communicate 10 tons or more of pressure from the tongue to the jaws and is comprised of a material resilient enough and hard enough to withstand multiple engagement and disengagement of at least 10 tons of pressure without cracking, disintegration, or substantial permanent deformation.

2. The device as described in claim 1 wherein the included angle between the faces of said tongue is 15°.

3. The device as described in claim 1 wherein the included angle between the faces of said tongue is in the range of 10° to 20°.

4. The device as described in claim 1 wherein the included angle between the faces of said pair of edges is 30°.

5. The device as described in claim 1 wherein the included angle between the faces of said pair of wedges is in the range of 20° to 40°.

6. The device as described in claim 1 wherein the included angle between the faces of said tongue is 15° and the included angle between the faces of said pair of wedges is 30°.

7. The devices as described in claim 1 wherein the included angle between the faces of said tongue is in the range of 10° to 20° and the included angle between the faces of said pair of wedges in the range of 20° to 40°.

8. The device as described in claim 1 wherein the first wedge and the second wedge are sized, angled and located such that during engagement with said tongue, said wedges can engage the faces of the tongue across their full widths.

9. The device as described in claim 1 wherein said wedges are comprised of an ultrahigh molecular weight polymer.

10. The device as described in claim 9 wherein said wedges are comprised of a material that is capable of absorbing high energy without breakage, is resilient and self-lubricating.

11. The device of claim 10 wherein the material is TIVAR-100.

12. Device as described in claim 1 further comprising anchor means for removably fastening the first wedge to the internal surface of the first jaw and the second wedge to the internal surface of the second jaw so that during repeated operation of the device the wedges are not dislodged, but that upon exhaustion of their useful life, the worn wedges may be removed and replaced without modification of the jaws.

13. The device as described in claim 1 wherein the angle between the face of the tongue and the face of said corresponding wedge for each of said corresponding is in the range of $2\frac{1}{2}$ to 15°.

14. A device for straightening a deformed core of a roll of sheet material, including:
   a hollow collar;
   at least a pair of jaws comprised of a first and a second jaw, the pair pivoted to the collar, the jaws having external and internal surfaces, the collar and the jaws being sized for receipt by the core;
   a tongue with at least two faces tapered to an edge with an included angle of 15° between the two faces and mounted for longitudinal movement within the jaws and the collar;
   means secured to the collar for selectively driving the tongue between the jaws to actuate the jaws outward;
   a pair of wedges, said pair comprising a first wedge with a first face thereon and second wedge with a second face thereon, said first and second face having an included angle of 30° therebetween, the first wedge being mounted to the internal surface of the first jaw and the second wedge being mounted to the internal surface of the second jaw, said pair of
   wedges thereby being in an opposing relationship on the internal surfaces of the jaws for engaging at an acute angle the faces of the tongue during the driving of the tongue between the jaws, wherein such engaging prevents contact between the jaws and the tongue, said pair of wedges having a surface with a low coefficient of friction which does not bind to the surface of the tongue at pressures of 10 tons or more of pressure from the tongue to the jaws and is comprised of a material resilient enough and hard enough to withstand mulitple engagement of the tongue of at least 10 tons of pressure and disengagement without cracking, disintegration, or substantial permanent deformation.

* * * * *